US007013142B2

(12) United States Patent
Roux et al.

(10) Patent No.: US 7,013,142 B2
(45) Date of Patent: Mar. 14, 2006

(54) COMMUNICATION METHOD, RADIO NETWORK CONTROLLER AND BASE NODE FOR IMPLEMENTING THIS METHOD

(75) Inventors: Pierre Roux, Argenteuil (FR); Denis Fauconnier, Saint-Remy-les-Chevreuse (FR)

(73) Assignee: Nortel Networks Limited, (CA)

( * ) Notice: Subject to any disclaimer, the term of this patent is extended or adjusted under 35 U.S.C. 154(b) by 514 days.

(21) Appl. No.: 10/081,423

(22) Filed: Feb. 22, 2002

(65) Prior Publication Data

US 2002/0119780 A1    Aug. 29, 2002

(30) Foreign Application Priority Data

Feb. 23, 2001    (FR) .................................. 01 02499

(51) Int. Cl.
  *H04Q 7/20* (2006.01)
(52) U.S. Cl. .................. 455/442; 455/437; 455/67.11; 455/425; 370/333; 370/332
(58) Field of Classification Search ........ 455/436–442, 455/63.1, 67.11–13, 114.1–114.4, 425, 423, 455/69, 426.1; 714/748–751; 370/331–333, 370/509–510, 522; 375/262, 341, 295, 316
See application file for complete search history.

(56) References Cited

U.S. PATENT DOCUMENTS

| 5,794,149 | A | * | 8/1998 | Hoo ............................ 455/438 |
| 5,867,791 | A |   | 2/1999 | Chambert |
| 5,892,802 | A | * | 4/1999 | Jung et al. ................... 375/354 |
| 5,944,844 | A | * | 8/1999 | Piirainen et al. ............. 714/704 |
| 6,157,820 | A | * | 12/2000 | Sourour et al. ........... 455/226.2 |
| 6,603,971 | B1 | * | 8/2003 | Mohebbi ..................... 455/437 |
| 2002/0052206 | A1 | * | 5/2002 | Longoni ..................... 455/453 |
| 2002/0118784 | A1 | * | 8/2002 | Teo et al. ................... 375/349 |

FOREIGN PATENT DOCUMENTS

| EP | 0 891 048 A | 1/1999 |
| EP | 0 998 057 A | 5/2000 |
| WO | WO 96 18227 A | 6/1996 |
| WO | WO 96 18277 | 6/1999 |

OTHER PUBLICATIONS

C.C. Lee et R. Steele, "Effect of Soft and Softer Handoffs on CDMA System Capacity", IEEE Transactions on Vehicular Technology, vol. 47 n°3, Aug. 1998, pp. 830-841.
The ETSI UMTS Terrestrial Radio Access (UTRA) ITU-R RTT candidate Submission, (http://www.etsi.org/smg).
Technical specifications (http://www/3gpp.org).

\* cited by examiner

*Primary Examiner*—Lester G. Kincaid
*Assistant Examiner*—Marcos L Torres
(74) *Attorney, Agent, or Firm*—DLA Piper Rudnick Gray Cary US LLP (57) ABSTRACT

An apparatus and method is provided for a cellular radio-communication using macrodiversity techniques. The method includes the transmission, to a first radio network controller, of a first frame of hard bits from a base node whose accuracy indicator has a so-called "good" level, if at least one accuracy, indicator has the good level, the transmission, to the first radio network controller if no accuracy indicator has the said good level, of each of the first frames of soft bits from at least two base nodes and the combination in the first radio network controller of the transmitted frames of soft bits in order to generate a second frame of hard bits.

16 Claims, 5 Drawing Sheets

COMMUNICATION METHOD, RADIO NETWORK CONTROLLER AND BASE NODE FOR IMPLEMENTING THIS METHOD

BACKGROUND OF THE INVENTION

The present invention relates to cellular radiocommunications using macrodiversity techniques.

The infrastructure of a cellular network comprises base stations distributed over the covered territory for communicating with mobile stations located in the zones, or cells, that they serve. The macrodiversity technique consists in providing for a mobile station to be able to communicate simultaneously with separate base stations in such a way that, in the descending direction (from the base stations to the mobile stations), the mobile stations receive the same information several times and, in the ascending direction, the signal transmitted by the mobile station is picked up by the base stations in order to form different estimates that are then combined in the network infrastructure.

Macrodiversity procures increased reception that improves the performance of the system due to the combination of different observations of a same information item. It also makes it possible to carry out soft intercellular transfers ("soft handoff") when the mobile station is moving.

Cellular networks can comprise sectored cells, in which the base station has a group of antennas arranged to transmit different radio signals in different directions defining the sectors of the cell. Macrodiversity can also be provided between several sectors of a same cell, the mobile station then receiving separate signals transmitted from the same base station. It is then referred to as "softer handoff" instead of "soft handoff" (see C. C. Lee and R. Steele, "Effect of Soft and Softer Handoffs on CDMA System Capacity", IEEE Transactions on Vehicular Technology, Vol 47, N°3, August 1998, pages 830–841). For the purposes of the present application, the term "base station" will designate either the base station of a non-sectored cell, or the means that a base station uses for defining one of the sectors of a sectored cell.

Macrodiversity techniques are particularly used in Code Division Multiple Access (CDMA) networks. They are provided in the third generation cellular system called UMTS ("Universal Mobile Telecommunications System"), in the context of wide band CDMA (W-CDMA) for frequency duplex communications (FDD). UMTS has been adopted in its general principles by the ETSI (European Telecommunications Standard Institute), and proposed to the International Telecommunications Union (ITU-R) for standardisation. The ETSI is distributing detailed documentation about it "The ETSI UMTS Terrestrial Radio Access (UTRA) ITU-R RTT Candidate Submission" on the Internet (http://www.etsi.org/smg). The partnership organisation for the third generation system (3 GPP) is distributing technical specifications on the Internet (http://www/3gpp.org) which relate to the UMTS system. These technical specifications use a proper vocabulary currently used in actual implementation projects.

For example, a base node (B node) groups one or more base stations of a same cell. A mobile station is called "User Equipment" (UE). A "Radio Network Controller" (RNC) manages one or more base nodes by means of base utilisation interfaces (Iub). For a given communication, a "Service Radio Network Controller" (SRNC) communicates with a UMTS switch by means of a utilisation interface (Iu). Another radio network controller (DRNC) can also communicate with the first radio network controller by means of network utilisation interfaces (Iur).

The invention more particularly relates to a use of macrodiversity on the uplink. The uplink denotes the communications from the user equipment to the cellular network infrastructure. When several base nodes each receive a radio signal value carrying a same information item transmitted by a user equipment, there is macrodiversity on the uplink.

A use of macrodiversity on the uplink gives rise to specific problems that do not arise with a use of macrodiversity on the downlink, that is to say from the cellular network infrastructure to the user equipment.

In the user equipment, the radio signals coming from several base nodes are available locally in order to be combined in such a way as to increase the reception quality.

When several nodes each receive a radio signal value carrying a same information item transmitted by a user equipment, it would be possible to think of gathering the various values of this signal at a same point where they would be combined, in a way similar to that which is done in a user equipment for the downlink. However, using the cellular network infrastructure for systematically gathering these various values necessitates sizing the network with a sufficient bandwidth for transferring the various values of the radio signal to a same point, to combine them in order to obtain a communication signal and to transfer the communication signal obtained to its recipient. The problem is amplified by the fact that several user equipments must be able to transmit several radio signals to one or more base nodes, thus giving rise to a considerable increase in traffic on the network of the cellular network infrastructure.

SUMMARY OF THE INVENTION

In order to overcome this problem, the invention proposes a method of communication on an uplink between a user equipment and a first radio network controller of a cellular network infrastructure comprising an active set of base nodes which each receive a radio signal transmitted by the said user equipment. The method comprises the following actions:

generation, in each base node of the active set, of at least a first frame of soft bits on the basis of the received radio signal and a corresponding first frame of hard bits;

transmission in the cellular network infrastructure, from each base node of the active set, an accuracy indicator which results from an error check on the first frame of hard bits;

transmission, to the first radio network controller, of the first frame of hard bits from that one of the base nodes whose accuracy indicator has a so-called "good" level, if at least one accuracy indicator has the said good level;

transmission, to the first radio network controller if no accuracy indicator has the said good level, of each of the first frames of soft bits from at least two base nodes and the combination in the first radio network controller of the first transmitted frames of soft bits in order to generate a second frame of hard bits.

In this way, when the accuracy indicator has the good level in one or more base nodes, it is not necessary to transmit the radio signal values to the radio network controller in order to combine them there. This relieves the cellular network infrastructure by reducing the quantity of transfers. When no accuracy indicator has the good level, the transmission of the frames of soft bits to the radio network controller, in order to combine them there, makes it possible to increase the reception quality.

The cellular network infrastructure is more easily available for transmitting frames of soft bits when no accuracy indicator has the good level. On receiving the frames of soft bits from at least two base nodes and on combining these frames of soft bits, the radio network controller then increases the reception quality.

BRIEF DESCRIPTION OF THE DRAWINGS

Other features and advantages of the present invention will appear in the following description of examples of embodiment given by way of illustration with reference to the appended drawings in which.

DESCRIPTION OF PREFERRED EMBODIMENTS

Figure 1:
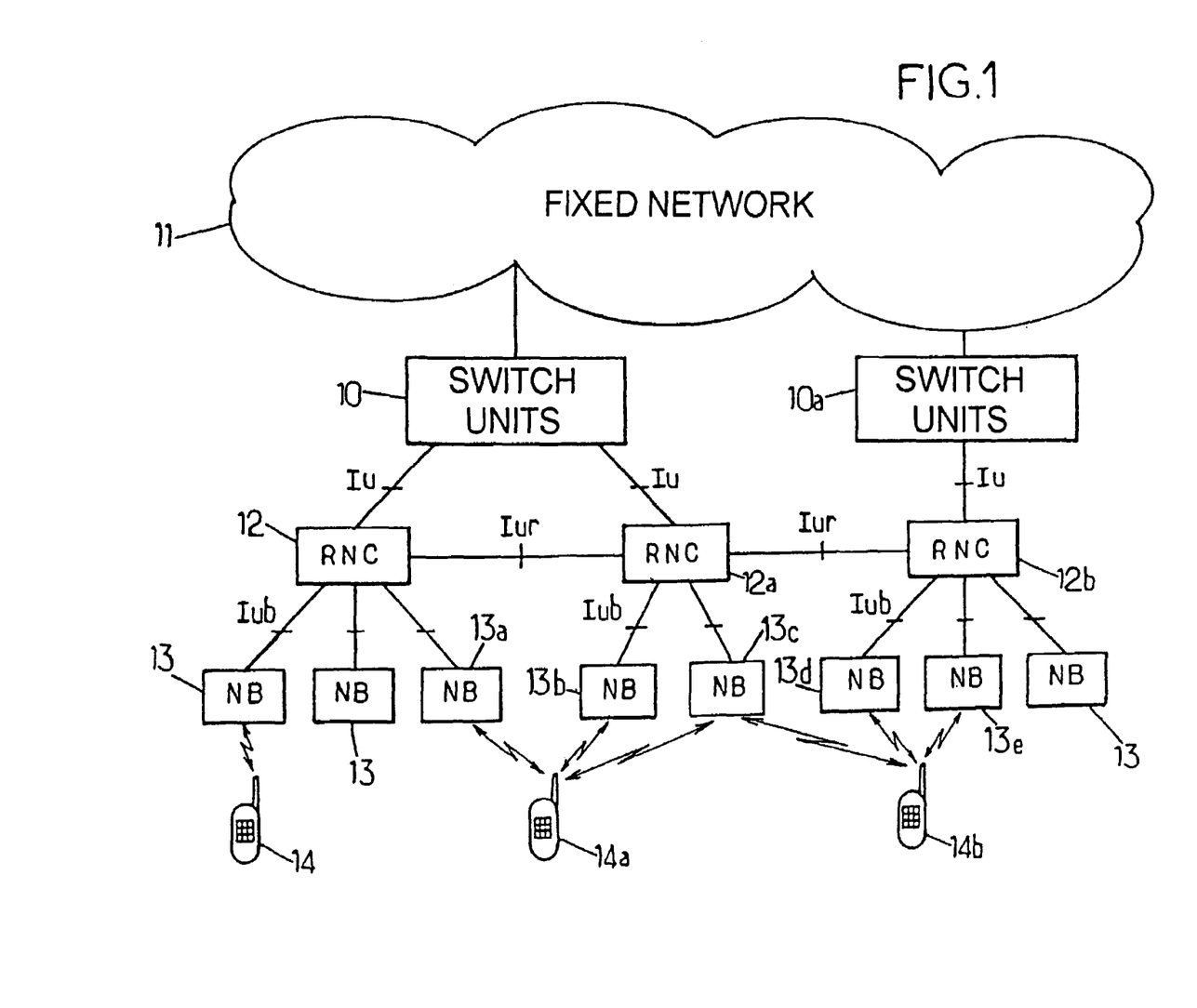
FIG. 1 shows a UMTS network system to which the invention can be applied.

With reference to FIG. 1, mobile service switches 10, belonging to a central network (CN, "Core Network"), are connected on the one hand to one or more fixed networks 11 and on the other hand, by means of a so-called "Iu" interface, to Radio Network Controllers (or RNCs) 12. Each RNC 12 is connected to one or more base nodes 13 by means of a so-called "Iub" interface. The base nodes 13, distributed over the territory covered by the network, are capable of communication by radio with User Equipments (UE) 14, 14a, 14b. The base nodes can group several base stations as explained in the continuation of the description. Certain RNCs 12 can furthermore communicate with each other by means of a so-called "Iur" interface. The RNCs and the base nodes form a cellular network infrastructure called UTRAN ("UMTS Terrestrial Radio Access Network").

The UTRAN comprises elements of layers 1 and 2 of the ISO model for the purpose of providing the links required for the radio interface (called Uu), and a "Radio Resource Control" (RRC) stage belonging to layer 3, as described in the technical specification 3G TS 25.331, "Radio Interface Protocol", Version 3.2.0, published in October 1999 by the 3GPP (3rd Generation Partnership Project). Seen from the higher layers, the UTRAN simply acts as a relay between the UE and the central network.

The Iub and Iur interfaces meet the requirements described in the technical specification 3G TS 25.427, "UTRAN Iub/Iur Interface User Plane Protocol for DCH Data Streams", Version 3.5.0, published in December 2000 by the 3GPP.

During a communication between the cellular network infrastructure and a user equipment 14, a downlink and an uplink are distinguished. According to the downlink, a controller 12 makes a node 13 transmit a radio signal value to the user equipment 14. According to the uplink, the user equipment 14 transmits a radio signal value to the base node, hereafter called B node 13, which can transfer its contents to the controller 12 by means of the Iub interface.

The fact that a radio signal value transmitted for example by the user equipment 14a is received by several B nodes 13a, 13b, 13c, is referred to as macrodiversity on the uplink.

In a known way, the user equipment 14a encodes speech or computer data by means of a data frame consisting of a bit train to which a cyclic error detecting code called CRC (Cyclic Redundant Check) is applied. The new bit train thus obtained is transmitted in the radio signal transmitted by the user equipment. The said technical specification 3 GPP TS 25.427 describes such an error detecting code on page 29.

In its routing between the user equipment 14a and each of the B nodes 13a, 13b, 13c, the radio signal is subjected to interference such as noise and attenuation. Hereafter a distinction will be made between bit called a "hard bit" and a bit called a "soft bit". A hard bit is a bit in the usual sense of the term, that is to say it can take one of two binary values, 0 or 1. In digital transmission, the transmitter transmits a train of hard bits in order to encode speech or data. Depending on the routing conditions, the values received by radio signal in each node 13a, 13b, 13c are not necessarily strictly equal to the transmitted values. A soft bit is a measure of probability that the received bit corresponds to a binary value, for example 1, of the transmitted hard bit. The probability that the received bit corresponds to the other binary value, 0 in this example, is implicit since the sum of the probabilities is always unity. The soft bit in question is either one or the other of these probabilities.

The mean of the probabilities, each corresponding to a soft bit received in a node 13a, 13b, 13c for a same transmitted hard bit, makes it possible to combine simply the received soft bits. In order to obtain the soft bits, the receiver of a node preferably uses a decoder of the SOVA (Soft Output Viterbi Algorithm) type in the case of convolute code decoding. In the case of turbo decoding, the reliability measurements output from decoder are naturally available for obtaining the soft bits.

According to the method according to the invention, a B node or base node 13a, 13b, 13c decodes the radio signal that it receives in order to generate a first frame of collected information. In order to do this, it is possible to use a known mechanism such as a shift register modelled on the one described on Page 188 of the book by Xavier Lagrange and others, entitled "Réseau GSM" (GSM Network), published by Hermès Science Publications in 2000. A Viterbi decoder such as explained on page 189 and the following pages of the said book makes it possible to correct certain transmission errors.

The CRC detection code makes it possible to generate an accuracy indicator which has a good level if no errors are detected during the decoding of the radio signal. On the other hand, the receiver of each base node carries out quality measurements, based for example on the measurement of a ratio C/I, where C represents a useful power of the radio signal picked up by the receiver and I represents a total power of interference by other radio signals. The quality measurements can also be based on bit-by-bit reliability measurements of an evaluation of the radio signal, averaged over the whole of a received frame, here considered as consisting of soft bits. These quality measurements make it possible to generate, for each frame, a quality indicator whose value results from the measurements.

In the network shown in FIG. 1, the B node 13a transmits the accuracy indicator and the quality indicator to the controller 12 via the Iub interface defined between them, the B nodes 13b and 13c transmit the accuracy indicator and the quality indicator to the controller 12a via each of the Iub interfaces defined between them. The transmission of the accuracy indicator and the quality indicator in the cellular network infrastructure of FIG. 1, is carried out in a data frame which advantageously uses the known ATM communications protocol.

The radio network controller 12a, constituting a first controller which manages the communication in question of the user equipment 14a, is called SRNC (Serving Radio Network Controller) in the 3 GPP specifications. The radio network controller 12 then constitutes a second controller called DRNC (Drift RNC) in the 3 GPP specifications. The controller 12 therefore transmits the accuracy indicator and the quality indicator from the node 13a to the controller 12a via the Iur interface defined between them, also advantageously using the ATM protocol.

According to the example described with reference to FIG. 1, the radio network controller 12a receives the accuracy and quality indicators of each of the B nodes 13a, 13b, 13c.

The previously described actions and those that follow them will now be described with reference to FIGS. 2a, 2b, 2c where different cases that may occur are envisaged.

Figure 2A:
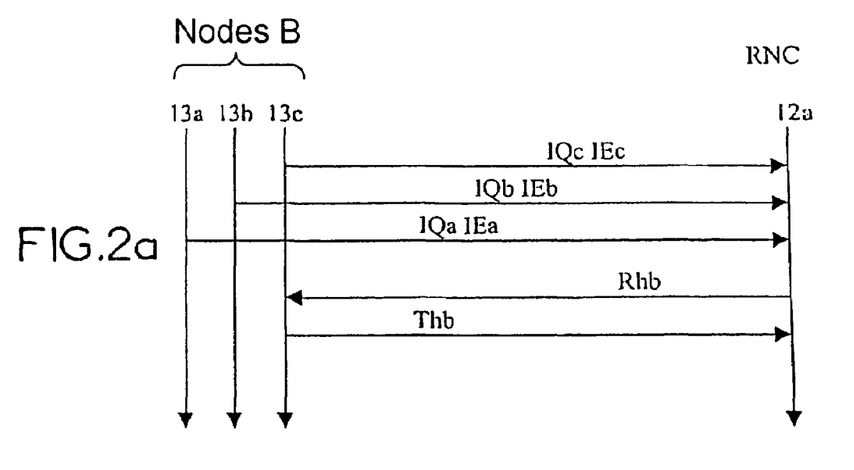
FIG. 2 shows various actions according to the method according to the invention.
Figure 2B:
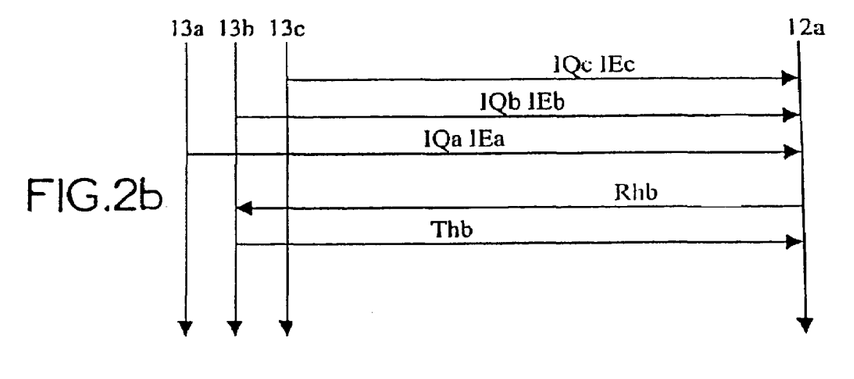
Figure 2C:
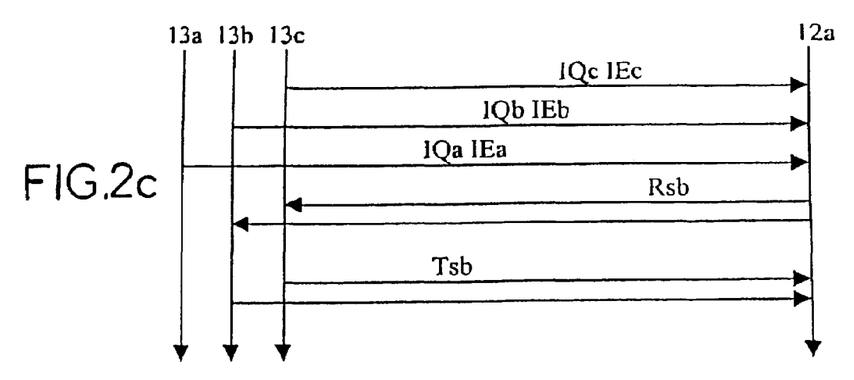

In FIGS. 2a, 2b, 2c, the downward arrows represent the flow of time, the horizontal arrows represent the exchanges of information between the B nodes and the RNC which result from the actions according to the method according to the invention.

In a way that is identical in FIGS. 2a, 2b, 2c, each accuracy indicator IEa, IEb, IEc is transmitted to the radio network controller 12a from the node 13a, 13b, 13c respectively.

The accuracy indicator IEc is assumed to have been received first by the radio network controller 12a. The accuracy indicator IEb is received after the accuracy indicator IEc with a delay of 3 ms for example. The accuracy indicator IEa is received by the radio network controller 12a with a delay of 5 ms for example after the reception of the accuracy indicator IEc.

In FIG. 2a, the three accuracy indicators IEa, IEb, IEc are assumed to have a good level, that is to say that the information frames that result from the decoding by each B node are representative of the radio signal transmitted by the user equipment 14a with a good level.

The radio network controller 12a then transmits via the Iub interface a request message Rhb to request the information frame from the B node 13c. The information frame consists of hard bits each of which can assume only one of the two binary values 0 or 1 in order to respectively represent, in the ATM protocol, one of two values, for example 1 and −1, of bits transmitted in the radio signal. This offers optimum compactness in comparison with a transfer of soft bits, each of which necessitates a digital word for encoding their various possible value levels. By requesting the frame from the B node whose accuracy indication is received first, the latency between the reception of the radio signal by the B node and the probable reception of the information frame by the radio controller 12a is reduced.

Various possibilities are envisaged for transmitting the request Rhb taking account of the transmission delays through the Iub and Iur interfaces.

According to a first possibility, the correct frame indicators are stacked in a queue of the controller 12a as they are progressively received by the controller 12a. The order of each correct frame indicator in the queue then makes it possible to know the first correct frame indicator received with a good level. For each frame, the operation consisting of transmitting the request Rhb to the B node whose correct frame indicator is first received with a good level is repeated.

It should be noted that in this case the request Rhb can be transmitted as soon as the first correct frame indicator is received.

According to a second possibility, the radio network controller memorises the delay associated with each reception of the correct frame indicator called the accuracy indicator for a succession of frames involved. This measurement is made for example using a clock counter triggered by the reception of the first indication concerning each frame and consulted at the time of the reception of subsequent indications for a same frame. This time measurement can be made with the resolution of the clock counter, that is to say the cycle time of the processing system in the radio network controller.

When the radio network controller has the delays associated with each B node of the active set for a frame in question, it accumulates them in counters associated with each node, reset to zero for a defined number k of frames. At the end of each period of k frames, the radio link controller has a list of average delays in order of increasing delay. This ordered list is used in a filter to activate by priority those nodes B whose average delay is low, at the time of hard bit transmission requests.

On receiving the request Rhb, the B node 13c sends a response message Thb to the controller 12a that contains the information frame consisting of hard bits.

The action which consists in transmitting to the radio network controller 12a a unique information frame consisting of hard bits avoids uselessly encumbering the Iub interface.

It is understood that if the request Rhb is sent to the node 13a, it passes through the Iur interface between the controllers 12 and 12a and then through the Iub interface between the controller 12 and the node 13a. On return, the response Thb passes through the same Iub and Iur interfaces. It can be that the transmission delays through these interfaces are shorter than the transmission delays through the Iub interface between the controller 12a and the node 13c, for example when the node 13c receives radio signals transmitted by other user equipments 14b which have a tendency to thus load the node 13c.

In FIG. 2b, the accuracy indicator IEc is assumed not to have the good level, the accuracy indicators IEa and IEb are assumed to have the good level. The radio network controller 12a then transmits the request Rhb to the B node with a good level accuracy indicator whose transmission delay is the shortest, which in this case is the node 13b. It is therefore the node 13b which send the response Thb containing the information frame that it has decoded.

In FIG. 2c, the accuracy indicators IEa, IEb, IEc are assumed not to have the good level. A possible solutions is to then send all of the soft bits of each node in order to combine them in the radio network controller. The process is further improved by systematically avoiding sending all the soft bits. A quality indicator IQa, IQb, IQc is transmitted respectively from each node 13a, 13b, 13c to the radio network controller 12a.

The radio network controller 12a then sends a request Rsb to the two B nodes, or more depending on a previously defined criterion, having provided the best quality indications, in this case the B nodes 13b and 13c. The request Rsb requests the frames of soft bits.

On receiving the request Rsb, the B nodes 13b and 13c each transmit a response Tsb to the radio network controller 12a. The response Tsb contains the frames of soft bits. A response Tsb is more voluminous than a response Thb because the value of a soft bit requires a word of several bits in order to be decoded, this value being representative of a probability between 0 and 1.

On receiving the soft bits from the B nodes 13b and 13c, the radio network controller 12a combines these soft bits and generates a frame of hard bits.

The excess encumbering of the Iub and possibly Iur interfaces due to the transfer of several Tsb responses, that are more voluminous than the Thb responses, therefore occurs only in the sole cases of absence of good level of the accuracy indicators in the B nodes, that is to say in the case of degraded reception in all of the B nodes. The transfer of several Tsb responses makes it possible in this case to improve the reception quality in the radio network controller 12a by using all or part of the macrodiversity by combination of the soft bits received from several B nodes.

Figure 3:
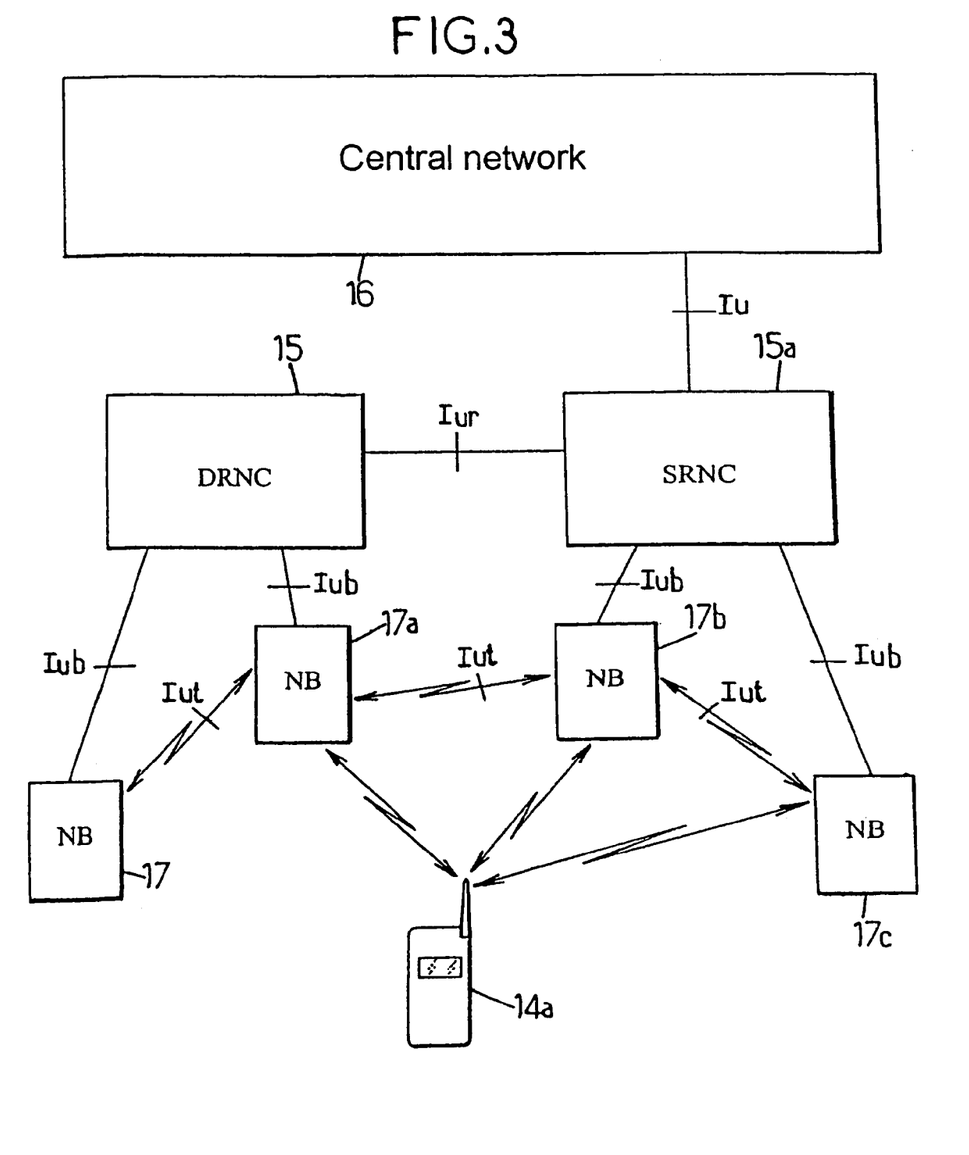
FIG. 3 shows another UMTS system to which the invention can be applied.

With reference to FIG. 3, the macrodiversity on the uplink results from the reception of an estimate of radio signal transmitted from a user equipment 14a, through an active set of B nodes 17a, 17b, 17c. A service radio network controller 15a is in connection with the nodes 17b and 17c via the interfaces Iub and with a branch radio network controller 15 via a Iur interface. The radio network controller 15a is in connection with a central network 16 via an interface Iu. The radio network controller 15 is in connection with the B node 17a and possibly with other B nodes 17 via Iub interfaces. The B nodes are interconnected via the interfaces Iut in packet carrying mode on radio links.

As before, each B node 17a, 17b, 17c of the active set generates a frame of hard bits on the basis of the radio signal transmitted by the user equipment 14a, with error checking.

In FIG. 3, the transmission of an accuracy indicator in the cellular network infrastructure is not carried out using the Iub interface but by using the Iut interface.

Each B node sends its accuracy indicator to one or more other B nodes of the active set. Pre-established rules between the B nodes of the active set determine which one or ones of the B nodes send the hard bits or the soft bits.

Figure 4A:
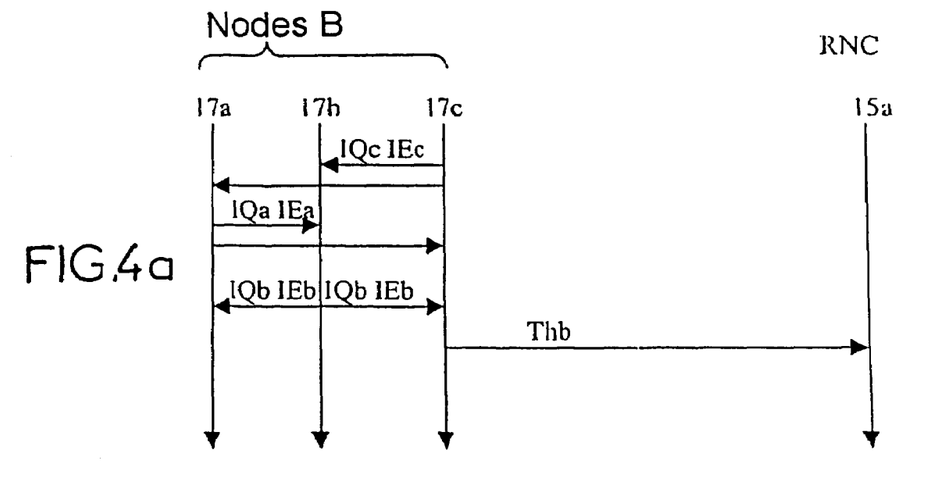
FIG. 4 shows actions according to the method according to the invention which use the architecture of FIG. 3.
Figure 4B:
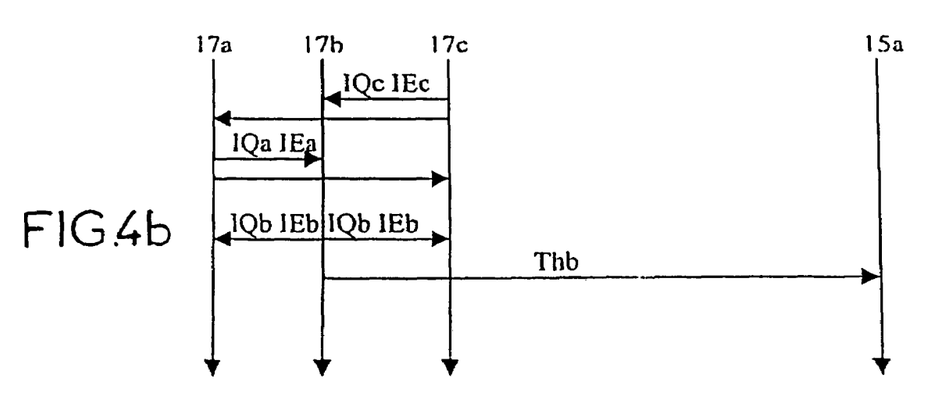
Figure 4C:
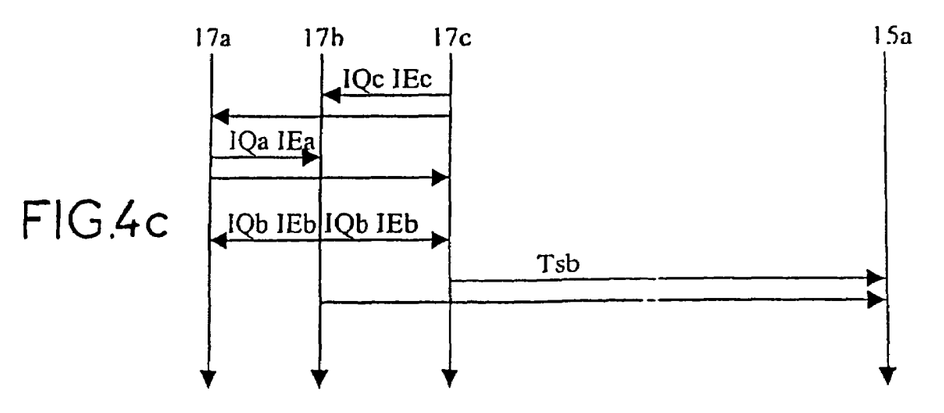

FIGS. 4a, 4b, 4c show an application of an example of rules for accuracy and quality indicators having levels identical to those of FIGS. 2a, 2b, 2c respectively.

With reference FIGS. 4a, 4b, 4c, the B nodes 17a, 17b, 17c transmit the accuracy indicators IEa, IEb, IEc respectively to other B nodes 17b, 17c, 17a of the set of active nodes via the Iut interfaces.

Advantageously, the B nodes 17a, 17b, 17c also respectively transmit the quality indicators IQa, IQb, IQc to other B nodes 17b, 17c, 17a via the Iut interfaces.

Each node in question makes use of the rule, for example programmed as follows:
  if its accuracy indicator has the good level and the node in question does not receive any accuracy indicator with the good level from another node which precedes it in a pre-established order common to all the nodes, it transmits to the radio network controller 15a its frame of hard bits in a message Thb via the Iub interface;
  if its accuracy indicator does not have the good level and the node in question does not receive an accuracy indicator with the good level from any other node, it compares its quality indicator with the quality indicators received from the other nodes and then, if at least one or more, according to the rule, quality indicators received from the other nodes has a level lower than its quality indicator, the node in question transmits to the radio network controller 15a its frame of soft bits in a message Tsb via the Iub interface.

In FIG. 4a, the three accuracy indicators have the good level. As the pre-established order of priority is node 17c, node 17b, node 17a, the application of the above rule causes a message Thb transmission from the node 17c.

In FIG. 4b, only the two accuracy indicators IEa and IEb have the good level and the application of the rule causes a message Thb transmission from node 17b.

In FIG. 4c, no accuracy indicator has the good level. The quality indicators IQc and IQb are assumed to have a better level than the quality indicator IQa. The application of the rule causes a Tsb message transmission from the nodes 17b and 17c.

Thus, the radio network controller 15a receives directly via these Iub interfaces either a frame of hard bits or the frames of soft bits from two B nodes. In the case of FIG. 4c, the network controller 15a combines and decodes the received signals as before.

With reference to FIG. 1, another user equipment 14b defines another active set of nodes 13c, 13d, 13e for which the network controller 12a is the service network controller and the network controller 12b is the branch network controller. The accuracy indicators transmitted by the nodes 13d and 13c are transmitted to the network controller 12b via the Iub interfaces between the radio network controller 12b and the B nodes 13d and 13e. If it receives an accuracy indicator with a good level, the network controller 12b chooses a B node 13e or 13d whose accuracy indicator it transmits to the network controller 12e and requests the chosen B node to transmit to it the frame of hard bits, to provide for a transmission to the controller 12a. If it does not receive any accuracy indicator of good level, the controller 12b chooses a base node 13d or 13e which it requests to send to it the soft bits to provide for a transmission to the controller 12a.

The controller 12b can also systematically transmit the accuracy indicators from all of the base nodes 13d, 13e of the active set, with which it shares a Iub interface, to the controller 12a via the Iur interface. It is then the controller 12a that does or does not choose one or more nodes 13e, 13d.

Figure 5:
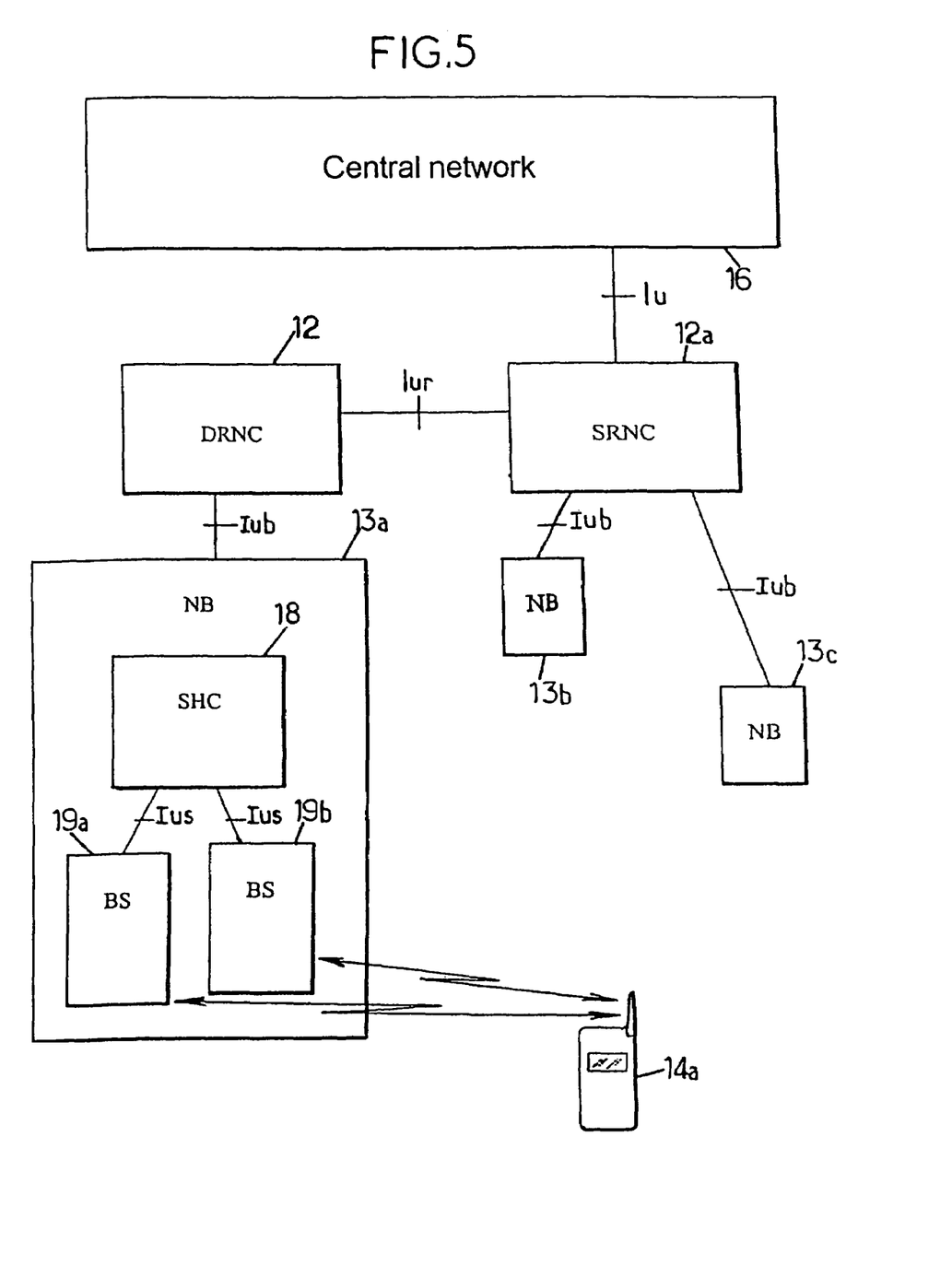
FIG. 5 shows a base node system to which it is also possible to apply the revelations of the invention.

With reference to FIG. 5, the base node 13a groups two base stations 19a and 19b controlled in the base node 13a by a base controller SHC, ("Softer Handover Controller") 18 by means of Ius interfaces. The method revealed by the invention is used again inside the base node 13a. In each base station 19a, 19b, a frame of hard bits is generated by decoding the radio signal transmitted by the user equipment 14a. An error check during the decoding in each base station 19a, 19b makes it possible to generate a local accuracy indicator. It then suffices to transmit a frame of hard bits to the base controller 18 when a local accuracy indicator as a good level and to transmit the frames of soft bits from the two base stations 19a and 19b when no local accuracy indicator has the good level. In this latter case, the base controller 18 combines the values thus received and decodes the result of this in order to generate a frame of hard bits with an accuracy indicator which results from the error check. The frame of hard bits from the node 13a is then the one that results from the combination in the base controller or the one transmitted via a Ius interface by a base station. The accuracy indicator transmitted by the base node 13a on the Iub interface is respectively the accuracy indicator generated by the base controller 18 or the local accuracy indicator of a base station when the latter has a good level.

In order to implement the previously described method, a base node according to the invention therefore comprises first means for generating a frame of soft bits and a frame of hard bits on the basis of the received radio signal, second means for transmitting in the cellular network infrastructure an accuracy indicator that results from the error check on the frame of hard bits and third means for transmitting, to the radio network controller, the frame of hard bits or the frame of soft bits. The first means make use of a demodulation of the received radio signal and the possible application of any known decoding technique. The second means can be implemented by means of decoding techniques exploiting codes optimized for this purpose, such as for example cyclic redundancy codes. The third means make use of those of the standard protocol on the Iub interface whilst adding, in the check frames of this protocol, data for indicating the transmission carried out: a frame of hard bits or a frame of soft bits.

In order to execute the actions shown in FIGS. 2a to 2c, the base node 13b, 13c comprises fourth means for receiving the request messages Rhb, Rsb that come from the network controller 12a. The fourth means are set up by means of a data processing program to activate the third means in order to transmit the frame of hard bits or the frame of soft bits depending on whether they receive the Rhb request or the Rsb request respectively.

In order to execute the actions shown in FIGS. 4a to 4c, the base node 17c comprises fourth means for receiving the accuracy and quality indicators from other base nodes 17b. The fourth means are set up by means of a data processing program to activate the third means in order to transmit the frame of hard bits or the frames of soft bits depending on whether they receive the Rhb request or the Rsb request respectively, to the network controller 15a.

A radio network controller according to the invention comprises first means for receiving a frame of hard bits or frames of soft bits and second means for combining the received values and for decoding them in order to generate a frame of hard bits. The first means make use of those of the standard protocol on the Iub interface whilst adding, in the check frames of that protocol, data to take account of the transmission carried out. The second means can be produced using an arithmetic and logic component that generates the average of the probabilities received for each soft bit and that generates a hard bit "0" when the average is less than 0.5 and a hard bit "1" when the average is greater than 0.5.

The means that have just been defined are sufficient for the radio network controller 15a to be able to execute the actions shown in FIGS. 4a to 4c.

In order to execute the actions shown in FIGS. 2a to 2c, the radio network controller 12a comprises third means for receiving one or more accuracy indicators, each one transmitted by a base node, and fourth means for requesting, if a received accuracy indicator has a good level, a first frame of hard bits from the base node that has transmitted this accuracy indicator, and for requesting, if no accuracy indicator has the good level, frames of soft bits from at least two base nodes. The third means make use of those of the standard protocol on the Iub interface whilst adding, in the check frames of that protocol, data for taking into account the reception of accuracy indicators. The fourth means comprise a program and a memory structure for analysing the levels of the received accuracy indicators.

The invention claimed is:

1. Method of communication on an uplink between a user equipment and a first radio network controller of a cellular network infrastructure comprising an active set of base nodes which each receive radio signals transmitted by the said user equipment, comprising the following actions:

generation, in each base node of the active set, of at least a first frame of soft bits on the basis of the received radio signal and a corresponding first frame of hard bits;

transmission in the cellular network infrastructure, from each base node of the active set, of an accuracy indicator which results from an error check on the frame of hard bits;

transmission, to the first radio network controller, of the said first frame of hard bits from a base node whose accuracy indicator has a so-called good level, if at least one accuracy indicator has the said good level;

transmission, to the first radio network controller if no accuracy indicator has the said good level, of each of the first frames of soft bits from at least two base nodes and the combination in the first radio network controller of the transmitted frames of soft bits in order to generate a second frame of hard bits.

2. Method of communication on an uplink according to claim 1, wherein:

each accuracy indicator transmitted in the cellular network infrastructure for the said uplink is transmitted to the first radio network controller;

the said first radio network controller, if it receives at least one accuracy indicator of good level, chooses that one of the base nodes whose accuracy indicator has the good level and requests the chosen base node to transmit to it the said first frame of hard bits;

the said first radio network controller, if it does not receive any accuracy indicator of good level, chooses at least two base nodes and requests them to transmit to it their frames of soft bits.

3. Method of communication on an uplink according to claim 2, wherein, among the nodes whose accuracy indicator has the good level, the said first radio network controller chooses the one from which it has first received the accuracy indicator.

4. Method of communication on an uplink according to claim 2, wherein, among the nodes whose accuracy indicator has the good level, the first radio network controller chooses the one that meets filtering criteria.

5. Method of communication on an uplink according to claim 2, comprising the following actions:

transmission in the said cellular network, from at least two base nodes of the active set to the first radio network controller, of a quality indicator which results from a measurement of the signal received by the said base node;

choosing, in the said first radio network controller, at least two base nodes with the best quality indicators received and requesting the chosen base nodes to transmit, to the said first radio network controller, the frames of soft bits from each chosen base node.

6. Method of communication on an uplink according to claim 1, wherein:

each accuracy indicator transmitted from another base node in the cellular network infrastructure for the said uplink, is transmitted to at least one base node of the said active set;

each base node applies rules established between the base nodes to the quality indicators that it receives and transmits, in order to decide to transmit or not to transmit, to the said first radio network controller, the first frame of hard bits from that base node or the first frame of soft bits, in order that one of the first frames of hard bits whose accuracy indicator has a said good level is transmitted from a base node or that the frames of soft bits are transmitted from at least two base nodes in the absence of an accuracy indicator with the said good level.

7. Method of communication on an uplink according to claim 1 wherein:
at least one accuracy indicator transmitted in the cellular network infrastructure is transmitted to a second radio network controller;
the said second radio network controller, if it receives an accuracy indicator with good level, transmits this accuracy indicator of good level to the first radio network controller, chooses that one of the base nodes whose accuracy indicator has the good level, transmits the accuracy indicator of good level to the first radio network controller and requests the chosen base node to send it to the said first frame of hard bits to provide for a transmission to the first radio network controller;
the said second radio network controller, if it does not receive an accuracy indicator of good level, chooses at least one base node and requests it to send to it its frame of soft bits to provide for a transmission to the first radio network controller.

8. Method of communication on an uplink according to claim 1 furthermore comprising the following actions executed in a base node comprising a base controller and grouping several base stations:
generation, in at least one base station of the base node, of a third frame of soft bits on the basis of the radio signal received from the user equipment by the said base station for the said uplink and a third frame of hard bits;
transmission in the base node, from each base station receiving the radio signal for the said uplink, of a local accuracy indicator that results from an error check on the frame of hard bits;
transmission, to the base controller, of the third frame of hard bits from a base station whose local accuracy indicator has the said good level, if at least one local accuracy indicator has the said good level;
transmission, to the base controller, if no local accuracy indicator has the said good level, of the frame of soft bits from at least one base station and combination in the base controller of the frames of soft bits transmitted and generation of a fourth frame of hard bits;
generation, in the base controller, of the accuracy indicator to be transmitted in the cellular network infrastructure such that the said accuracy indicator has the best level between that of the local accuracy indicator and the one that results from an error check on the fourth frame of hard bits.

9. System for communicating on an uplink between a user equipment and a first radio network controller of a cellular network infrastructure comprising an active set of base nodes which each receive radio signals transmitted by the said user equipment, comprising:
means for generating, in each base node of the active set, at least a first frame of soft bits on the basis of the received radio signals and a corresponding first frame of hard bits;
means for transmitting in the cellular network infrastructure, from each base node of the active set, an accuracy indicator which results from an error check on the frame of hard bits;
means for transmitting, to the first radio network controller, the said first frame of hard bits from a base node whose accuracy indicator has a so-called good level, if at least one accuracy indicator has the said good level;
means for transmitting, to the first radio network controller if no accuracy indicator has the said good level, each of the first frames of soft bits from at least two base nodes and means for combining in the first radio network controller the transmitted frames of soft bits in order to generate a second frame of hard bits.

10. System according to claim 9, wherein:
the means for transmitting each accuracy indicator in the cellular network, infrastructure for the said uplink are arranged for transmitting it to the first radio network controller;
the said first radio network controller having means for, if it receives at least one accuracy indicator of good level, choosing that one of the base nodes whose accuracy indicator has the good level and requesting the chosen base node to transmit to it the said first frame of hard bits;
the said first radio network controller having means for, if it does not receive any accuracy indicator of good level, choosing at least two base nodes and requesting them to transmit to it their frames of soft bits.

11. System according to claim 10, wherein, among the nodes whose accuracy indicator has the good level, the said first radio network controller comprises means for choosing the one from which it has first received the accuracy indicator.

12. System according to claim 10, wherein, among the nodes whose accuracy indicator has the good level, the first radio network controller comprises means for choosing the one that meets filtering criteria.

13. System according to claim 10, comprising:
means for transmitting in the said cellular network, from at least two base nodes of the active set to the first radio network controller, a quality indicator which results from a measurement of the signal received by the said base node;
means for choosing, in the said first radio network controller, at least two base nodes with the best quality indicators received and means for requesting the chosen base nodes to transmit, to the said first radio network controller, the frames of soft bits from each chosen base node.

14. System according to claim 9, wherein:
the means for transmitting each accuracy indicator from another base node in the cellular network infrastructure for the said uplink, are arranged for transmitting it to at least one base node of the said active set;
each base node comprises means for applying rules established between the base nodes to the quality indicators that it receives and transmits, in order to decide to transmit or not to transmit, to the said first radio network controller, the first frame of hard bits from that base node or the first frame of soft bits, in order that one of the first frames of hard bits whose accuracy indicator has a said good level is transmitted from a base node or that the frames of soft bits are transmitted from at least two base nodes in the absence of an accuracy indicator with the said good level.

15. System according to claim 9, wherein:
the means for transmitting an accuracy indicator in the cellular network infrastructure are arranged for transmitting at least one accuracy indicator to a second radio network controller;
the said second radio network controller comprises means for, if it receives an accuracy indicator with good level, transmitting this accuracy indicator of good level to the first radio network controller, choosing that one of the base nodes whose accuracy indicator has the good level, transmitting the accuracy indicator of good level to the first radio network controller and requesting the chosen base node to send to it the said first frame of hard bits to provide for a transmission to the first radio network controller;

the said second radio network controller comprises means for, if it does not receive an accuracy indicator of good level, choosing at least one base r ode and requesting it to send to it its frame of soft bits to provide for a transmission to the first radio network controller.

16. System according to claim 9, furthermore comprising the following means executed in a base node comprising a base controller and grouping several base stations:

means for generating, in at least one base station of the base node, a third frame of soft bits on the basis of the radio signal received from the user equipment by the said base station for the said uplink and a third frame of hard bits;

means for transmitting in the base node, from each base station receiving the radio signal for the said uplink, a local accuracy indicator that results from an error check on the frame of hard bits;

means for transmitting, to the base controller, the third frame of hard bits from a base station whose local accuracy indicator has the said good level, if at least one local accuracy indicator has the said good level;

means for transmitting, to the base controller, if no local accuracy indicator has the said good level, the frame of soft bits from at least one base station and means for combining in the base controller of the frames of soft bits transmitted and means for generating a fourth frame of hard bits;

means for generating, in the base controller, the accuracy indicator to be transmitted in the cellular network infrastructure such that the said accuracy indicator has the best level between that of the local accuracy indicator and the one that results from an error check on the fourth frame of hard bits.

* * * * *